United States Patent [19]
Williams

[11] Patent Number: 5,189,663
[45] Date of Patent: * Feb. 23, 1993

[54] METHOD OF AND SYSTEM FOR REMOTE TESTING AND REPORTING OF ISDN LINE CONDITIONS

[75] Inventor: Clifton B. Williams, Richmond, Va.

[73] Assignee: C & P of Virginia, Richmond, Va.

[*] Notice: The portion of the term of this patent subsequent to Mar. 5, 2008 has been disclaimed.

[21] Appl. No.: 515,007

[22] Filed: Apr. 26, 1990

Related U.S. Application Data

[63] Continuation-in-part of Ser. No. 394,090, Aug. 15, 1989, Pat. No. 4,998,240.

[51] Int. Cl.⁵ ................................................ H04J 3/14
[52] U.S. Cl. .......................................... 370/17; 370/13; 371/20.1
[58] Field of Search ................ 370/13, 110.1, 17; 371/20.1, 20.5, 8.1

[56] References Cited

U.S. PATENT DOCUMENTS

| | | | |
|---|---|---|---|
| 4,611,320 | 9/1986 | Southard | 370/15 |
| 4,663,754 | 5/1987 | Senoo | 370/13 |
| 4,730,313 | 3/1988 | Stephenson et al. | 370/94.1 |
| 4,922,482 | 5/1990 | Tanahashi et al. | 370/13 |
| 4,989,202 | 1/1991 | Soto et al. | 370/13 |
| 4,998,240 | 3/1991 | Williams | 370/110.1 |

*Primary Examiner*—Benedict V. Safourek
*Assistant Examiner*—Min Jung
*Attorney, Agent, or Firm*—Lowe, Price, LeBlanc & Becker

[57] ABSTRACT

In an integrated services digital network (ISDN), a selected customer ISDN line at a central office is tested by remote control from an ISDN testing facility so that it is unnecessary to dispatch service personnel to the office to carry out the test. At least D-channel data from the ISDN line to be tested is obtained from the standard U-interface bus, accessed at the central office using the line card sparing feature of a standard integrated services line unit (ISLU). The D-channel data is applied to a personal computer at the central office, programmed to carry out protocol analysis and to supply at least one of data indicative of the protocol analysis and raw data used to perform the protocol analysis to a report communication line. Another computer at the ISDN test facility controls the operation of the computer at the central office over a dedicated communication line.

26 Claims, 5 Drawing Sheets

METHOD OF AND SYSTEM FOR REMOTE TESTING AND REPORTING OF ISDN LINE CONDITIONS

CROSS-REFERENCE TO RELATED APPLICATION

This application is a Continuation-In-Part application of, and claims priority from, U.S. patent application Ser. No. 07/394,090 entitled "Method of and System for Remote Testing of Integrated Service Digital Networks" filed on Aug. 15, 1989, now U.S. Pat. No. 4,998,240.

TECHNICAL FIELD

The present invention relates generally to testing of integrated services digital networks (ISDN), and more particularly, to a method of and system for remote and unattended testing and reporting of the condition of customer ISDN lines at an unmanned central office.

BACKGROUND ART

Integrated services digital network (ISDN) is a relatively newly developed and emerging field of telecommunications which integrates computer and communications technologies to provide, world wide, a common, all-digital network. This is based, in part, on standardizing the structure of digital protocols developed by the International Telegraph and Telephone Consultative Committee (CCITT) so that, despite implementation of multiple networks within national boundaries, from a user's point of view there is a single, uniformly accessible, worldwide network capable of handling a broad range of telephone, data and other conventional and enhanced services.

A complete description of the architecture of ISDN is beyond the scope of this specification. For details, and for an extensive bibliography of references on ISDN, see Stallings, *ISDN, AN INTRODUCTION*, Macmillan Publishing Company, 1989.

Figure 1:
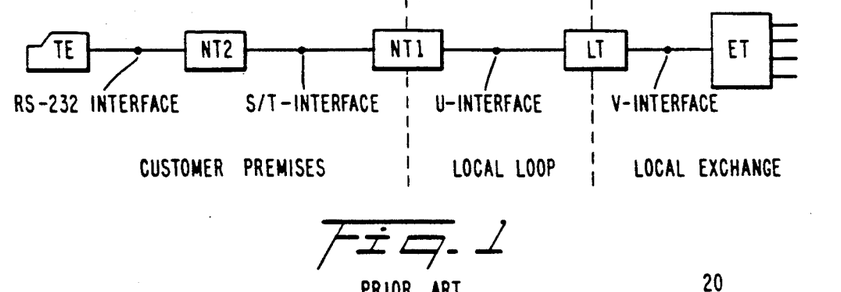
FIG. 1 is a simplified circuit diagram of an integrated services digital network.

As an overview of ISDN, and the interfaces therein, reference is made to FIG. 1 wherein a customer premises is interconnected with a local exchange. At the customer premises an "intelligent" device such as a digital PBX, terminal controller or local area network (LAN) can be connected to an ISDN terminal TE, such as a voice or data terminal, which is connected, over an "RS-232-Interface", to a network termination NT1. Although not shown, non-ISDN terminals may be connected to a termination NT2 over the RS-232-Interface and another device termed a "terminal adapter". The NT2 in turn is connected over an "S/T-Interface", which is a four wire bus, to a termination NT1 that performs functions such as signal conversion and maintenance of the electrical characteristics of the loop. The NT1 thus is a termination between customer and telephone company equipment.

At the local loop, a two-wire bus, termed the "U-interface", or "loop" interconnects network termination NT1 and a loop termination LT at the central office. Finally, the "V-interface" is a bus between the local loop at the carrier end and exchange switching equipment. Details of this architecture are provided in *Integrated Services Digital Networks (ISDN): An Overview*, DataPro Research, Concepts & Technologies, MT20-365-101 to 110, published by McGraw Hill Incorporated (December, 1988).

A number of communication channels are established between the central office and ISDN subscriber; the transmission structure consists of a pair of B-channels each carrying 64 kilobits per second of data and a D-channel that carries 16 kilobits per second of data. The B-channels in practice are used to carry digital data, pulse code modulated encoded digital voice or a mixture of lower rate traffic including, optionally, packet switched data. The D-channel carries common channel signalling information to control circuit switched calls on associated B-channels at the user interface, and may also carry packet switching or low-speed telemetry. Data on the D-channel provides information to the central office switch on status of the customer telephone, e.g., that the customer has gone off-hook, and information necessary to control telephone functions such as activate the status lamp, control the ringer, etc.

Standards for the S/T-Interface have already been defined by CCITT; equipment supplied by different manufacturers which subscribe to those standards can be connected to network terminations as there will be no protocol incompatibilities. Standards for the U-interface, however, have not yet been defined. Special integrated circuits currently produced only by American Telephone and Telegraph (AT&T) and incorporated into AT&T equipment, are required for compatibility with the U-interface. Accordingly, whereas the principles of the present invention have general applicability to ISDN network testing, the invention shall be described in an AT&T system operating environment.

Figure 2:
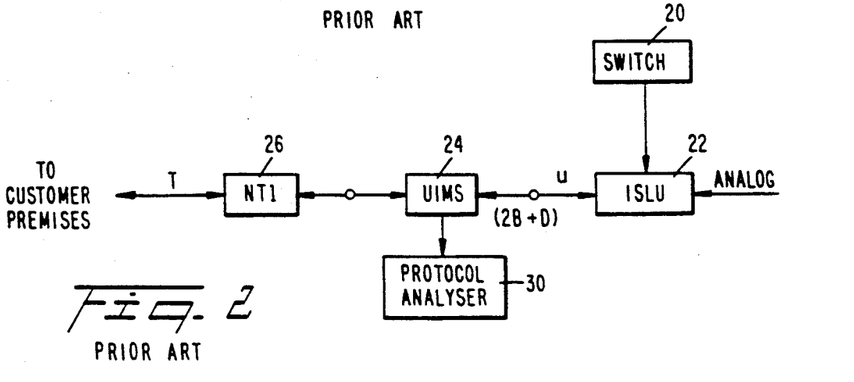
FIG. 2 is a diagram of the central office circuitry to support ISDN.
Figure 3:
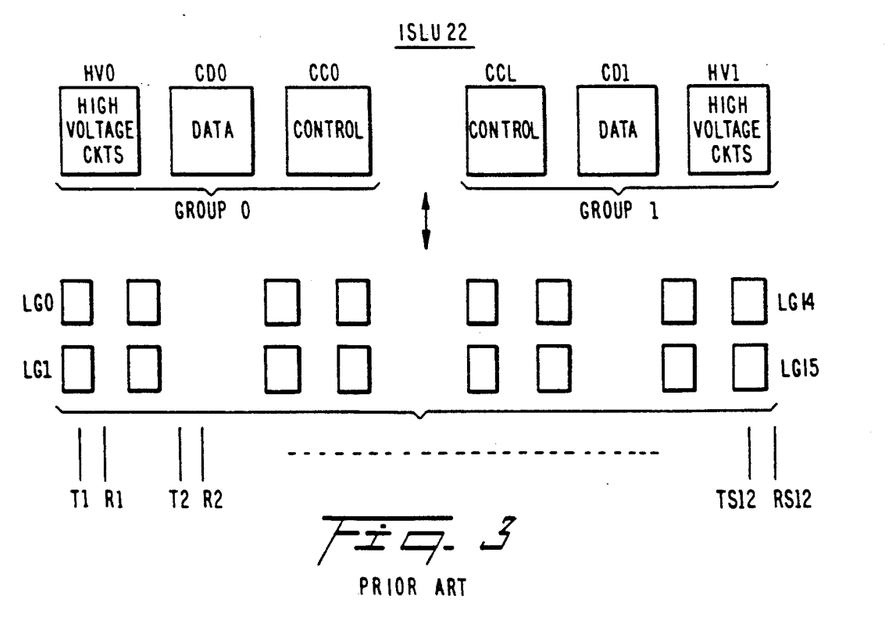
FIG. 3 is a simplified diagram of an integrated services line unit (ISLU).
Figure 4:
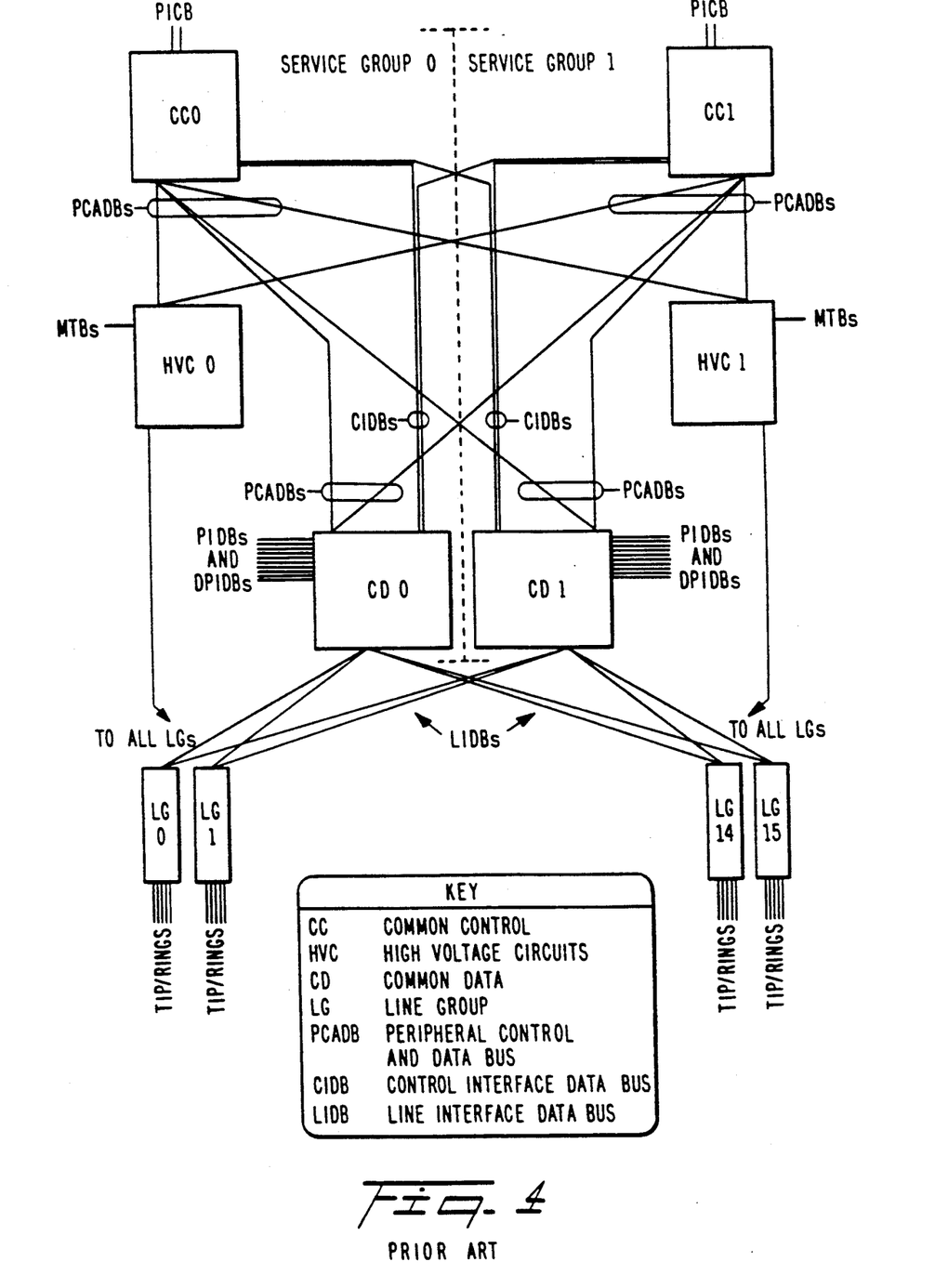
FIG. 4 is a more detailed diagram of the ISLU.

Thus, referring to FIG. 2, at the central office of the carrier (telephone company) is a solid state switch 20, provided by AT&T under the name 5ESS (TM) switch, for routing calls. As the 5ESS (TM) switch is well known, details will not be provided herein. An overview of digital switches is given in *Switching Systems*, DataPro Research Corporation, Concepts and Technologies, MT20-050-201 to 215, published by McGraw Hill Corporation (February 1988). Also at the central office is a conventional integrated services line unit (ISLU) 22, manufactured by AT&T, to interface customers with the 5ESS (TM) switch. The ISLU 22, which satisfies ISDN interface requirements, implements a "2B+D" channel structure and is compatible with both the T- and U-interfaces. The ISLU 22 receives up to 512 customer lines in 16 line groups, as shown in FIG. 3, and carries out duplex operation in two service groups at control cards CC0 and CC1. Data handling is carried out by cards CD0 and CD1, and metallic functions are performed by HV1 and HV2 which also contain line testing and high level service circuitry. Data cards CD0, CD1 are in circuit with the switch 20 over the standard peripheral interface data buses (PIDB) and directly connected PIDBs (DPIDB). The common control cards CC0, CC1 receive instructions from a central office switch processor (not shown) over the PICBs. The high voltage circuits HV1, HV1 are connected on the standard metallic test bus (MTB) to enable any metallic functions such as ringing of customer lines and line testing to be performed. A complete block diagram summarizing the architecture of the standard AT&T ISLU is shown in FIG. 4. The manner by which the AT&T ISLU processes customer calls originating with or terminating at the ISLU, is well known in the industry and shall not be described in detail herein.

Referring to FIG. 2, supplied to the ISLU 22 is the U-interface, used in ISDN, as well as the standard analog interface. Data on the U-interface is optionally monitored by a U-interface monitoring system (UIMS) 24, manufactured by AT&T, interposed in series between the ISLU 22 and a network termination NT1 associated with the telephone or terminal of an ISDN customer. The purpose of the UIMS 24 is to monitor the protocol of control data on the U-interface, to determine whether the ISDN line of a customer is functioning properly. The UIMS separates the B1-, B2-, and D-channel bit streams (2B+D) on the U-interface, and presents this data to a protocol analyzer 30 that typically is transported to the central office by service personnel.

The protocol analyzer 30, which is conventional, carries out ISDN protocol decoding to enable both B-channel and D-channel traffic to be tested. However, it is only the D-channel traffic that ordinarily is tested, as it is only the D-channel that contains the supervisory data necessary to assess the operation of a customer ISDN line, including information to control operations such as feature activation, lamp operation, ringing, dialing and supervision. In this regard, a protocol analyzer is analogous to a "butt-set" currently used to test analog telephone lines.

However, implementing efficient protocol analysis in an ISDN network having a large number of nodes poses particular problems. The prior art has sought to test ISDN networks by installing dedicated protocol analyzers to monitor the S/T-Interface; this is costly and time consuming as it requires a field visit on every trouble call. Furthermore, service personnel employed by the telephone company cannot properly access the customer side of the S/T-Interface.

Protocol monitoring and analysis are better performed at the central office. The test system shown in FIG. 2 implements the UIMS to monitor the customer ISDN lines at each central office. However, this also is disadvantageous because it still requires dispatching of service personnel to those central offices which are unmanned, as is necessary to physically insert a plug to interconnect the UIMS and the main distribution frame of the ISLU. Such a procedure is not easily implemented.

One particular system implemented in the prior art multiplexes the D-channel data obtained from the UIMS up to 56 kilobits per second or 64 kilobits per second, using a Remote Access Test Device (TM), manufactured by Tekelec, Calabasas, Calif., with input to one B-channel of an on-site standard 750X modem, to be transmitted to a central test facility for protocol analysis of a line under test. However, this technique requires that service personnel be dispatched to the central office to make the connection between the UIMS and main distribution frame, to access the U-interface bus.

In view of the above, it would be desirable to provide a system wherein the ISDN lines could be tested at the central test facility without requiring service personnel to be dispatched to initiate the testing. It would also be desirable to provide the data received from the UIMS and/or data generated from the protocol analyzer indicative of the test results directly to remote locations from the central office under test.

DISCLOSURE OF THE INVENTION

Accordingly, one object of the invention is to test customer ISDN lines and report data indicative of the test results to remote locations without the necessity of dispatching personnel to a customer site or central office.

Another object is to provide a hard copy of the data at the remote location.

Another object of the invention is to provide a method of and system for testing and reporting of customer ISDN line conditions at an ISDN test facility remote from a central office serving the lines.

Another object is to carry out remote and unattended testing and reporting of customer ISDN line conditions using equipment that is low in cost and easily implemented.

A further object of the invention is to analyze protocol of D-channel data on the U-channel bus of customer ISDN lines at a central office serving the lines and to automatically transmit data indicative of the analysis to remote locations, without the necessity to dispatch service personnel to the office.

Another object is to provide unattended protocol analysis of ISDN channel data at a central office serving selected customer ISDN lines and direct reporting of analysis data to remote locations.

The above and other objects of the invention are satisfied, at least in part, by providing, at a central office serving customer ISDN lines to be tested, circuitry for accessing at least the D-channel data of a selected customer ISDN line, and a first computer programmed to provide protocol analysis. The at least D-channel data is applied to the first computer for protocol analysis. The first computer is coupled to a report communication line. A second computer at a test facility remote from the central office controls the operation of the first computer to carry out the protocol analysis and to selectively supply data to the report communication line. A hard copy report can be generated at a remote location, if desired, by a facsimile coupled to the report communication line and adapted to receive the data supplied to the report communication line. The data Accordingly, it is not necessary to dispatch service personnel to the central office to perform the protocol analysis necessary to test selected ISDN lines.

In accordance with a preferred embodiment of the invention, the at least D-channel data is obtained from the U-interface bus at the central office. The U-bus preferably is accessed at the conventional integrated services line unit (ISLU) at the central office using the "line card sparing" feature of the ISLU. This is carried out by permanently connecting a conventional U-interface monitoring system (UIMS) to one of the sparing cards provided with the ISLU and selectively rerouting the sparing card to the line card associated with a customer ISDN line to be tested. The output of the UIMS is applied to the first computer, at the central office, which is programmed to perform protocol analysis of the at least D-channel data and is controlled by the second computer at the remote facility. In so doing, the protocol of D-channel data of any customer ISDN line can be tested without dispatching service personnel to the central office. Data indicative of the result of the protocol analysis is reported to remote locations via the report communication line. The raw data used to perform the protocol analysis, i.e., the D-channel data, can also protocol analysis, i.e., the D-channel data, can also be transmitted by the first computer to remote locations via the report communication line if so desired.

In accordance with one aspect of the invention, the UIMS or other D-channel data supplying means is enabled in response to a remote control signal transmitted from the remote test facility. This prevents "collisions" that would otherwise tend to occur between ISDN line testing as described herein, and maintenance that is carried out by routine exercise (Rex) by the central office. Preferably, the remote control signal is applied to a relay that, when enabled, applies operating power to the D-channel data supplying means.

In accordance with another aspect, the central office may contain a plurality of ISLU's for interconnecting a large number of ISDN lines at the central office to the conventional solid state switch provided by the telephone company. To provide multiplexing among the ISLU's so as to access a selected customer ISDN line for testing, circuitry at the central office is responsive to a remote control signal transmitted from the remote test facility for selecting one of the ISLU's at a time for routing of a "U" interface therein to the UIMS.

In accordance with a further aspect of the invention, an apparatus for remote and unattended testing of an integrated services digital network (ISDN) at a central office comprises:

(I) ISDN testing equipment at the central office including
 (a) a monitor for accessing a U-interface bus of a selected customer ISDN line at the central office,
 (b) a circuit path established for obtaining from the U-interface bus at least D-channel data on a selected customer ISDN line, and
 (c) a protocol analyzer for providing protocol analysis of said at least D-channel data;
 (d) a report mechanism for transmitting data to remote locations from the central office;
(II) an ISDN testing facility remote from the central office; and
(III) remote control circuitry located at the ISDN testing facility for controlling the ISDN testing equipment at the central office.

Preferably, the circuit path (b) is established by rerouting a sparing card of the standard ISLU at the central office to the line card slot associated with the ISDN line to be tested. The monitor is connected between the sparing card and the network terminal of the customer, and supplies at least D-channel data obtained from the U-bus to the protocol analyzer.

In the preferred embodiment, the protocol analyzer is implemented by a personal computer programmed to carry out protocol analysis. The personal computer at the central office is controlled on a dial up line by another computer at the remote test facility.

In accordance with the method of this invention, the following steps are carried out. At the central office, the method provides:

(a) selecting a customer ISDN line;
(b) accessing a U-interface bus of a selected customer ISDN line;
(c) monitoring at least D-channel data on said selected ISDN line;
(d) analyzing the protocol of the at least D-channel data; and
(e) selectively supplying data to a report communication line.

The following additional steps are performed at an ISDN test facility remote from the central office:

(e) generating control signals for controlling steps (b)–(e); and
(f) transmitting the control signals to the central office.

The method preferably is practiced in the environment of the central office serving the customer ISDN lines to be tested and whereat are located at least one integrated services line unit (ISLU) having a plurality of line cards positionable in line card "slots" in circuit with corresponding U-interfaces each containing ISDN B- and D-channel data. At least one of the line card slots therein is available as a sparing slot to receive a line card configured to be a sparing card, reroutable by the standard Metallic Access Network of the ISLU to replace the selected line card to be tested. The method more particularly comprises the steps of:

at the central office
(a) selecting an ISDN line to be tested,
(b) accessing a U-interface bus of a selected ISDN line by routing the selected line card to the sparing slot containing the sparing card,
(c) monitoring at least D-channel data at the output of the sparing card, and
(d) analyzing the protocol of at least the D-channel data;
(e) selectively supplying data to a report communication line; and at an ISDN test facility remote from the central office
(f) transmitting a first control signal to the central office to control step (b), and
(g) using a computer, transmitting second and third control signal to the central office for controlling steps (d) and (e), respectively.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR PRACTICING THE INVENTION

The invention is based in part on the realization that the U-interface bus at the central office can be accessed through the line card sparing feature of the conventional ISLU. This feature enables any of the ISLU line cards to be rerouted to a sparing slot whereat a line sparing card resides and the U-interface on the sparing bus can be accessed.

To more fully appreciate the principles of this invention, the line sparing feature of the conventional AT&T ISLU will be described. In conventional practice, ISLU architecture provides the metallic access necessary for a spare line circuit to be switched in the place of a faulty line circuit; this is sometimes referred to as a "hot spare" capability. A fault may be detected on a "per call" basis or on a routine basis through diagnostic testing of analog lines by a conventional diagnostic exercise provided by AT&T under the name "REX". Per-call tests are carried out before terminating a call or when an origination is detected. In instances when faults cause the analog line card to be unable to detect originations, detection of the fault is made only during full diagnostic testing by REX on a routine basis. Once a line card is determined to be faulty, it is bypassed by a spare line card resident at the ISLU for that purpose, i.e., it is "spared".

More specifically, the conventional ISLU contains 512 line cards, each located in a line card slot, to interconnect the tip and ring of a customer line and the central office switch. Among the 512 line cards are at least one, and probably two, line cards that are configured, using jumpers, as a spare (sometimes termed "sparing") line card provided to electrically bypass and replace a customer line card determined to be faulty. This is carried out through a switching array, termed a "Metallic Access Network" (MAN) by AT&T that is standard in the conventional ISLU.

Figure 5:
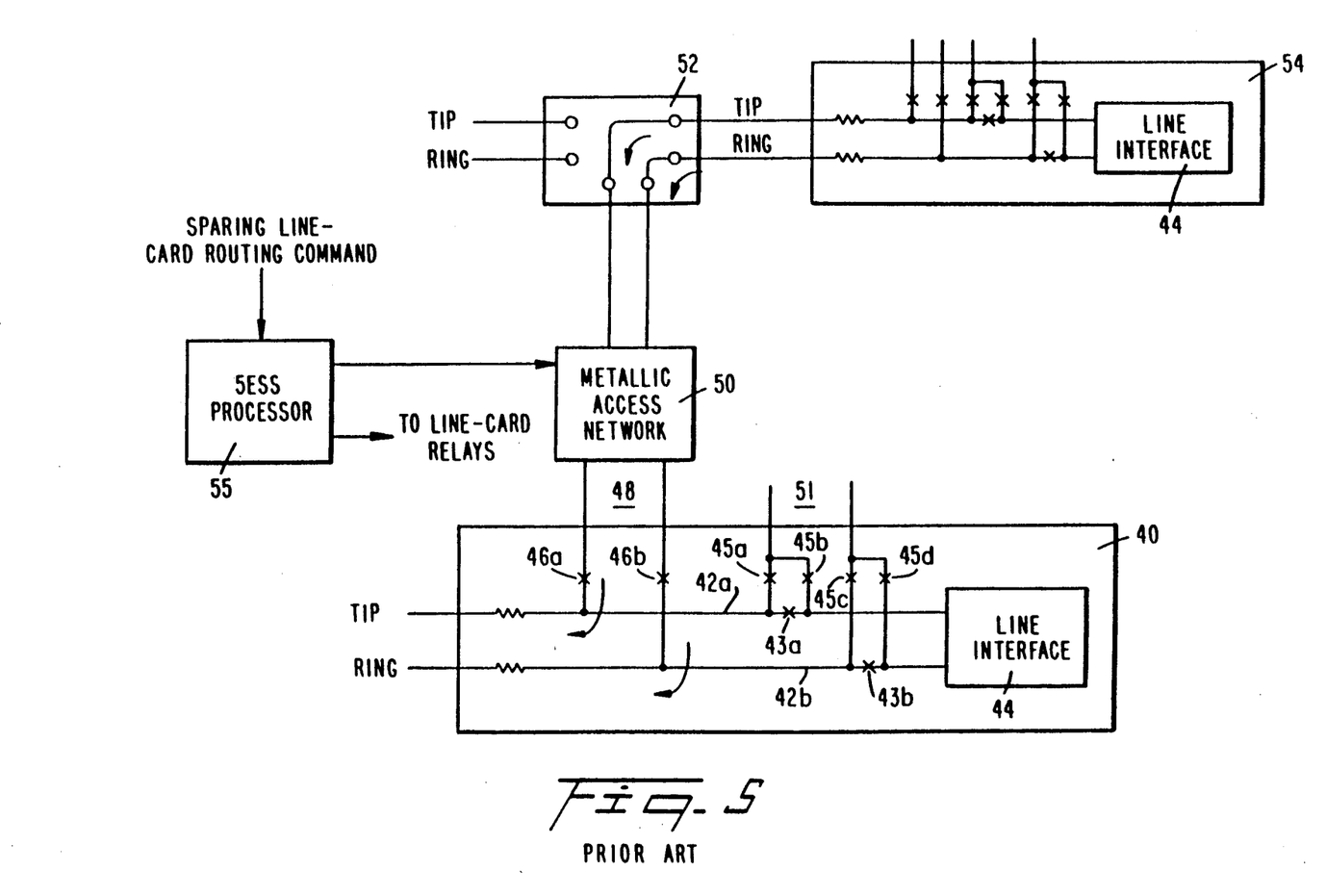
FIG. 5 is a circuit diagram showing the line card sparing feature of the ISLU.

Referring to FIG. 5, each line card 40 contains a pair of metal leads 42a, 42b that form a portion of the U-interface bus interconnecting the tip and ring of a customer line and a line interface 44 of the central office switch. A first pair of relay contacts 43a, 43b is connected in the U-interface 42a, 42b to selectively isolate the corresponding customer ISDN line from the central office switch. Also connected to the lines 42a, 42b is a line group bus 48, containing a second pair of relay contacts 46a, 46b. The line group bus 48 is connected to one port of the Metallic Access Network 50. At the other port of the Metallic Access Network 50 is connected a spare, or option, plug 52, jumpered to form the wiring configuration shown. Another line card, configured as a sparing line card 54, is connected to the spare plug 52 at a "sparing slot" in the plug.

Another pair of leads is connected to the U-interface leads 42a, 42b through relay contacts, or "crosspoints", 45a, b, c, d, to be configured for particular applications. All relay contacts are independently controllable by the switch processor 55.

In normal line card operation, relay contacts 43a and 43b are closed, so that a loop including the tip and ring leads of a customer line is formed between the customer terminal and the central office switch.

When the line card sparing feature is implemented, the relay contacts 43a, 43b on card 40 are opened, to interrupt the loop between the customer terminal and the central office switch. With contacts 43a, 43b of line card 40 open, the relay contacts 46a, 46b of line group bus 48 are closed, and a circuit path between spare plug 52 and line card 40 is established through the Metallic Access Network 50. This is controlled by the central office switch processor 55, which may be a 3B20 computer. The processor 55 in turn is controlled by instructions sent over a dedicated line by personnel operating a standard AT&T Trunk Line Work station from a remote service facility. The Metallic Access Network 50 in this manner is capable of interconnecting the sparing line card 54 to any one of the remaining line cards, determined to be defective, by service personnel at the remote facility.

In accordance with the invention, the tip and ring of the U-interface, routed to the sparing card 54 through the MAN 50 and spare plug 52, is connected in series with a UIMS 24, which extracts the B- and D-channel data therefrom. Accordingly, as a result of circuit routing of the tip and ring of the selected customer line by the Metallic Access Network 50, the U-interface bus of any selected customer line is made to be available to the sparing line card 54.

Figure 6:
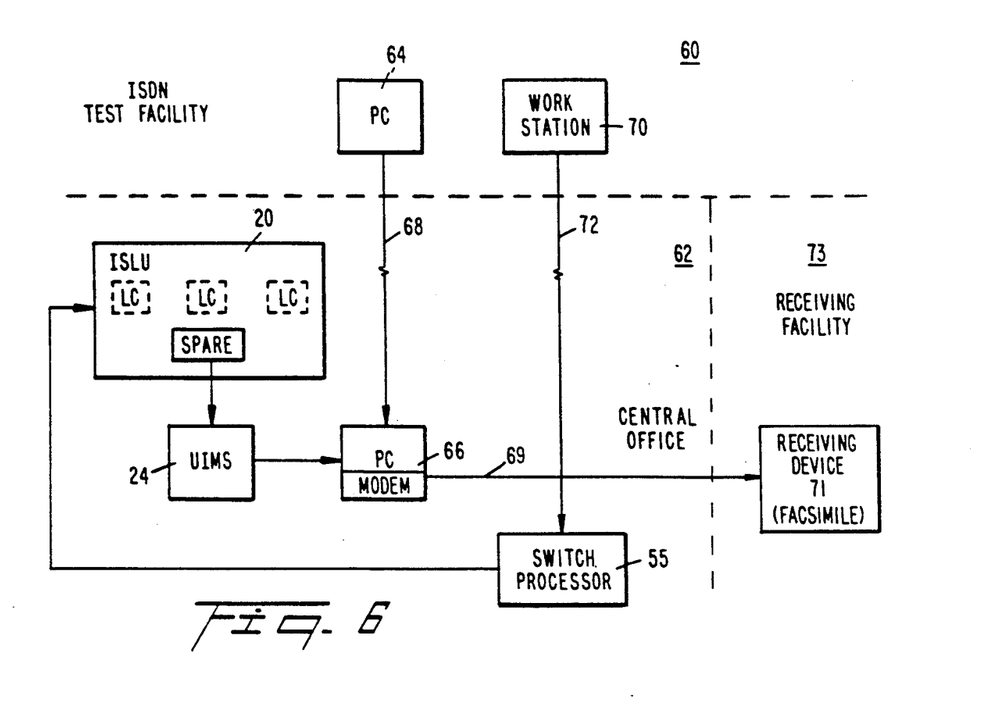
FIG. 6 is a diagram of an ISDN testing system in accordance with one embodiment of the invention.

With the above background in mind, reference is now made to FIG. 6, wherein a system for remote and unattended testing of customer ISDN lines comprises an ISDN test facility 60, remote from a central office 62, serving ISDN lines to be tested. At the facility 60 are a personal computer 64, programmed to carry out communications with another personal computer 66 at the central office 62. Communications is established between the two computers 64 and 66 using master-slave communications software, such as pcAnywhere (TM), over a dial-up ISDN line 68. pcAnywhere (TM), manufactured by Dynamic Microprocessor Associates, Inc., enables the operator at the remote facility 60 to control all the operations of computer 66. Although other communication programs can be used for this purpose, one particularly useful attribute of pcAnywhere (TM) is that it enables the functions of computer 66 at the central office to be controlled from the keyboard of computer 64 at the remote test facility, and that the monitor display at computer 64 is a simulation of the monitor display at computer 66.

The computer 66 is provided with a modem and communications software, for example Complete Fax 9600 manufactured by The Complete PC, Inc., to enable data to be transmitted to any desired remote location over a report communication line 69. Thus, a command can be sent from computer 64 to computer 66 via the line 68 to initiate reporting of data, either data indicative of the protocol analysis performed and/or the raw data used to perform the protocol analysis, directly from computer 66 to a remote receiving facility 73.

A receiving device 71 is provided at the remote receiving facility 73 to receive the data transmitted by the computer 66 over the report communication line 69. Preferably, the receiving device 71 is a facsimile machine adapted to receive data supplied to the report communication line 69 by the computer 66 and generate a hard copy report. For example, the screen display of the computer 66 is transmitted to and reproduced by the facsimile machine generating a hard copy report from which repair work orders can be generated. Other types of devices, however, may be employed at the receiving facility such as a computer and printer.

Also at the test facility 60 is the standard AT&T Trunk Line Work station 70, or an equivalent, that is connected, through a dedicated line 72, to the central switch processor 55 which controls the line card sparing feature of the ISLU 20.

Figure 7:
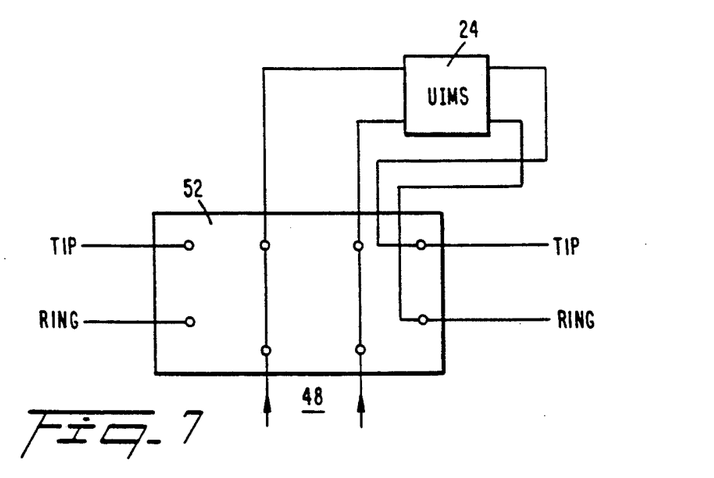
FIG. 7 is a wiring diagram showing how the option plug at the ISLU is modified to be accessed by the UIMS.

Referring to FIG. 7, the spare plug 52 in the ISLU 20 is modified to receive, in series, the UIMS 24 to obtain from the U-interface bus associated with the selected customer line at least the D-channel data thereon, in other words, the UIMS 24 monitors the D-channel data and possibly the B-channel data as well. Although both B- and D- channel data are available at the U-interface bus, it is only the D-channel data that is of interest for the purpose of testing the operation of a customer ISDN line.

The D-channel data, monitored by UIMS 24, is applied over a serial bus 74, in RS 232 or other suitable format, to the serial port of computer 66 for protocol analysis. One example of a program for carrying out protocol analysis of ISDN data is "LM1 Protocol Analyzer" (TM), provided by Progressive Computing. The LM1 (TM) is in the form of a circuit board, plugged into one of the slots of computer 66, that controls the computer to be menu driven and to be automatically configured to carry out decode analysis of ISDN protocols. Although LM1 (TM) is preferred, other equivalent computer programming to carry out this function can be used. Furthermore, it is within the scope of this invention to use any type of dedicated protocol analyzer, rather than a personal computer programmed to provide protocol analysis, for this purpose.

The operation of the system for testing a selected customer ISDN line is as follows. Recall that ISLU 22 contains 512 line cards, and assume that one of the cards (e.g., at slot 15) is configured to function as a sparing card. Assume further that a customer ISDN line associated with a line card at slot 20 is to be tested. The office equipment (OE) of the ISDN line to be tested is removed from service by the trunk line work station 70 which communicates a command for service, over the dedicated line 72, to central office switch processor 55. Any manner of controlling the central office switch processor 55 to carry out U-line card sparing feature can be used. However, in the preferred embodiment, U-line card sparing is provided by implementing recent change view 4.23 at the trunk line work station 70, defining thereat both the customer line to be monitored (slot 20 in the present example) and the address of the sparing line U card (slot 15). Recent change view 4.23 is a sparing feature made available by AT&T with its conventional ISLU and accessed at the work station 70. These commands, supplied to processor 55 at the central office, cause the processor to configure the Metallic Access Network 50 in the manner required. At this time, the sparing U-line card 54 is connected, through spare plug 52, UIMS 24 and Metallic Access Network 50, to the selected customer ISDN line.

At least D-channel data, obtained from the U-line bus by UIMS 24, is supplied to the computer 66 at the central office for protocol analysis. At this time, the computer 66 at the central office is controlled by personnel at computer 64, located at the test facility, and the result is displayed on the screens of both computers. The result data and/or the raw D-channel data is supplied to the report communication line 69 when a report command signal is sent from the computer 64 to the computer 66.

When remote monitoring of the customer ISDN line is no longer needed, the communication program is terminated, and the program exited, to ready the computer to set up the next call.

It was described previously that routine exercise maintenance (REX) is periodically executed at the central office, to locate line failures. However, there is some potential for "collisions" between diagnostic testing carried out by REX and protocol analysis provided in this invention. In particular, because the UIMS 24 is connected to the sparing line card 54, and routine maintenance requires a diagnostic loop-back of this card, the REX will always indicate diagnostic failures at least on the line card being spared.

Figure 8:
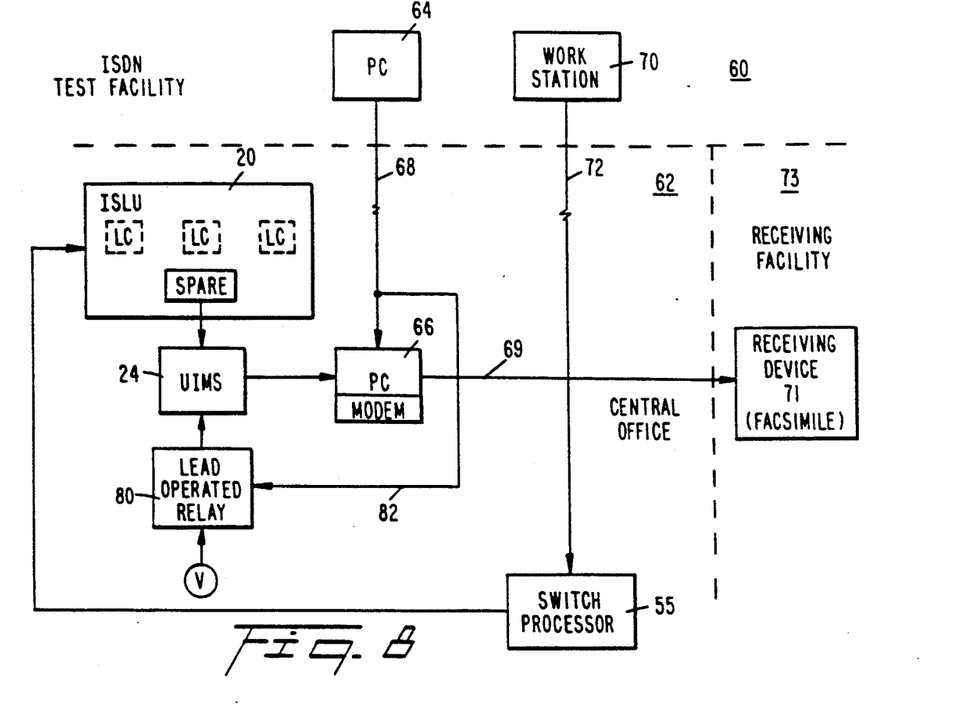
FIG. 8 is a diagram of an ISDN testing system in accordance with a second embodiment of the invention, wherein the UIMS is powered only during an ISDN line test.

This possibility of "collision" is avoided by enabling the UIMS 24 to operate only when ISDN protocol analysis is being carried out. In this regard, with reference to FIG. 8, the UIMS 24 is powered from the AC line or other source through a lead operated relay 80, that detects an incoming data call on line 68, through lead 82. In response to a call, the relay 80 closes and thereby applies operating power to the UIMS 24. The UIMS 24 now carries out monitoring of the U-interface bus. When the remote test call terminates, the relay 80 opens, and removes operating power from the UIMS 24. One example of a suitable lead operated relay to be applied as the relay 80 for this purpose is an LOR II (TM), supplied by Black Box Corporation of Pittsburgh, Pa.

Figure 9:
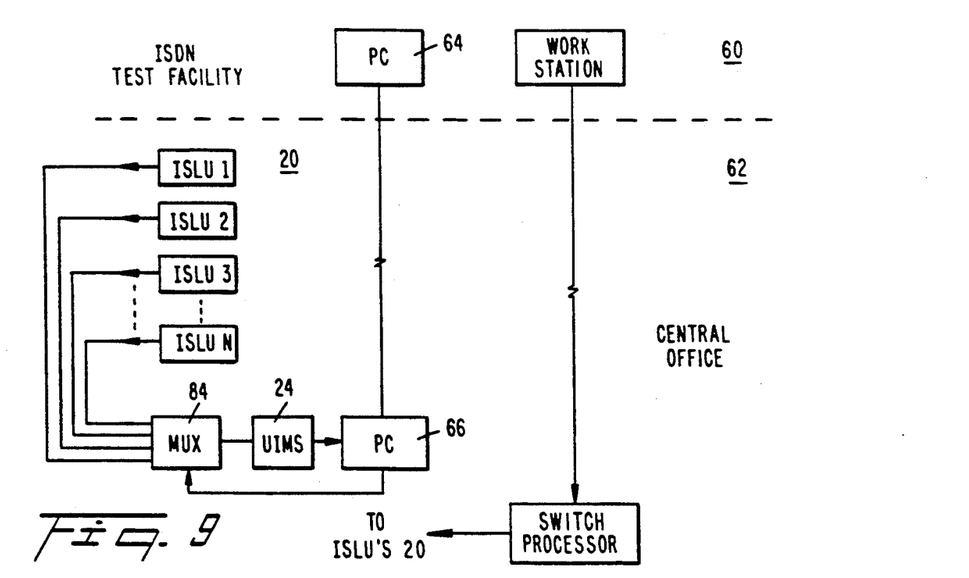
FIG. 9 is a diagram of an ISDN testing system in accordance with a third embodiment, wherein multiple ISLU's are selected for access, one at a time, by a multiplexer.

As mentioned previously, the conventional ISLU contains 511 ISDN lines in addition to the sparing line, that can be accessed through the Metallic Access Network and line card sparing feature. On the other hand, some installations contain multiple ISLU's, so that it is necessary to provide some means to access, selectively, any one of the ISLUs at a time. Thus, in accordance with another embodiment of the invention, shown in FIG. 9, a multiplexer (MUX) 84 is controlled by computer 66, under the command of an operator at computer 64 at the remote test facility, to select the one out of a plurality of ISLUs, containing the customer line to be tested. Preferably, the multiplexer 84 is in the form of a relay control card mounted in computer 66 and controlled to close, selectively, any of several relays each having a contact connected to a power source and being wired to switch the UIMS 24 into the spare plug in each ISLU 20.

One example of a suitable relay control card for carrying out the multiplexing function of this embodiment is a PDISO-8 8 channel isolated relay output/input interface board, manufactured by Metrabyte Corporation.

There accordingly has been described a system and method for remote and unattended testing and reporting of the condition of any selected customer ISDN lines at a central office by accessing the U-interface using the U-line card sparing feature of the conventional ISLU. ISDN channel data is accessed at the sparing card by a U-interface monitoring system (UIMS) connected in circuit with the standard option plug of the ISLU; the UIMS supplies the data, in serial format, to a personal computer at the central office. The computer, which is programmed to carry out protocol analysis and supply data to a report communication line, is controlled by another computer at an ISDN test facility remote from the central office. Line card sparing is routed, in a conventional manner, through a Metallic Access Network at the central office in response to commands sent from the trunk line work station at the remote facility.

Accordingly, it is not necessary to dispatch service personnel to either the customer site or the central office, to test any selected customer ISDN line.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

GLOSSARY OF TERMS

B-Channel—A transparent digital channel of 64K bits per second, to be used for digital, voice, or high-speed data transmission.

CCITT (International Telegraph and Telephone Consultative Committee)—International committee to standardize ISDN protocol and other communications protocols.

Central Office—Facility at carrier end for housing switch and other telco equipment.

D-Channel—A nontransparent digital signal of 16K or 64K bits per second, used for signaling the association with one or more B-channels; also can be used for telemetry and for low speed, packet switched data.

ET (Exchange Termination)—The carrier's local exchange switch.

ISDN (Integrated Services Digital Network)—This is a planned worldwide telecommunications service that uses digital transmission and switching technology to support voice and digital data communications.

ISLU (Integrated Services Line Unit)—AT&T Equipment that receives up to 512 customer lines in 16 line groups, and carries out duplex operation including data handling and metallic functions.

LAN (Local Area Network)—A system for interconnecting two or more communicating devices, usually in an office or campus, or other geographically limited region.

Line Card—Card containing relays and lines forming a portion of U-interface bus.

LM1 (TM)—Protocol analyzer program provided by progressive computing.

LT (Loop or Link Termination)—The equivalent of NT1 at the carrier's central switching office.

MAN (Metallic Access Network)—Direct Current (DC) facilities.

MTB (Metallic Test Bus)—Bus that tests metallic (direct current) functions.

MUX (Multiplexer)—Switch apparatus at the central office for establishing call routing; solid state switch.

NT1 (Network Termination 1)—A device responsible for the carrier's side of a connection, performing functions such as signal conversion and maintenance of the electrical characteristics of the loop.

NT2 (Network Termination 2)—An intelligent device responsible for the user's side of the connection to the network, performing functions such as multiplexing and switching.

NTE (Network Terminating Equipment)—A grouping of ISDN functions at the boundary between ISDN and the subscriber.

PBX (Private Branch Exchange)—A telephone exchange on the user's premises that provides circuit switching for telephones on extension lines and access to the public telephone network.

pcAnywhere (TM)—Master-slave communication program provided by Dynamic Microprocessor Associates, Inc.

PICB (Peripheral Interface Control Bus)—A control data bus to which the ISLU is connected.

PIDB (Peripheral Interface Data Bus)—A data bus to which the ISLU is connected.

Protocol Analyzer—Apparatus for extracting data from ISDN bit stream.

REX (Routine Exercise)—Testing routine that takes place periodically and routinely at the central office to locate line failures.

RS-232-Interface—A reference point between a terminal and the network, i.e., between TE, or TA, and NT2.

Sparing Line Card—Card configured to be a replacement for any defective line card in ISLU.

S/T-Interface, sometimes termed T-Interface—A reference point between subscriber's portion of the network and the carrier's portion; the reference point between NT1 and NT2 (four-wire).

TA (Terminal Adapter)—An interface adapted for connection of one or more pieces of terminal equipment to the network. Contains protocol or interface conversion.

TE (Terminal Equipment)—Any separately housed equipment or group of equipment units located on user premises on the user's side of a network interface.

TLWS (Trunk Line Work Station)—AT&T Equipment located at remote test facility for controlling sparing card rerouting and other functions.

U-Interface—The local loop of the carrier; the reference point between NT1 and LT (two-wire).

UIMS (U-Interface Monitoring System)—AT&T Equipment that monitors the U-interface and separates traffic into B- and D-channel bit streams.

V-Interface—The reference points between the carrier's end of local loop and the exchange switching equipment; the reference point between LT and ET.

What is claimed is:

1. A system for remote and unattended testing and reporting of ISDN protocol at a central office, comprising:

means for accessing at least D-channel data of a selected customer ISDN line at said central office;

a first computer at said central office programmed to perform protocol analysis of data applied thereto, wherein said first computer includes a communication device coupled to a report communication line;

means for supplying said at least D-channel data to said first computer for performing protocol analysis thereof;

a second computer at a test facility remote from said central office;

a communication path interconnecting said first and second computers; and means responsive to said second computer at said remote test facility and incorporating said communication path for controlling said first computer at said central office to provide said protocol analysis of said at least D-channel data and to selectively supply at least one of said D-channel data and data indicative of said protocol analysis to said report communication line.

2. The system of claim 1, further comprising a receiving device selectively coupled to said report communication line.

3. The system of claim 2, wherein said receiving device comprises a facsimile machine.

4. The system of claim 1, including means responsive to a remote control signal transmitted from said remote test facility for enabling said D-channel data supplying means.

5. In a central office containing customer ISDN lines and a "U" interface monitoring system (UIMS) that converts data on a "U" interface in an integrated services line unit (ISLU) for interconnecting said customer ISDN lines and said UIMS to serial data outputs including B-channel data and D-channel data, said ISLU containing a plurality of "U" line cards including at least one sparing "U" line card slot and means for routing any one of said "U" line cards to said sparing slot as a sparing line card, a system for remote and unattended testing of ISDN protocol of signals on a selected customer ISDN line, comprising:
  means for interconnecting said sparing line card and the input of said UIMS so that said UIMS develops output signals including at least said D-channel data;
  protocol analyzer means responsive to the output of said UIMS for analyzing said at least D-channel data;
  reporting means for selectively supplying at least one of data indicative of the analysis performed by said protocol analyzer means and said D-channel data to a report communication line; and
  means located at a test facility remote from said central office for controlling said routing means, said protocol analyzer means and said reporting means to test the protocol of at least one of B-channel data and D-channel data on a selected customer ISDN line and supply data to said report communication line.

6. The system of claim 5, further comprising receiving means coupled to said report communication line for receiving data supplied to said report communication line and generating a hard copy of said data.

7. The system of claim 5, including means responsive to a remote control signal transmitted from said remote test facility for enabling said UIMS to output said B- and D-channel data.

8. The system of claim 5, including a plurality of ISLU's, and means for selecting one of said plurality of ISLU's at a time for said routing of a "U" interface therein to said UIMS.

9. Apparatus for remote and unattended testing and reporting of an integrated services digital network (ISDN) at a central office, comprising:
  (I) ISDN testing equipment at said central office including
    (a) means for accessing a U-interface bus of a selected customer ISDN line at said central office,
    (b) means for obtaining from said U-interface bus at least D-channel data on a selected customer ISDN line, and
    (c) analyzer means for providing protocol analysis of said at least D-channel data;
    (d) reporting means for supplying data to a report communication line;
  (II) an ISDN testing facility remote from said central office; and
  (III) remote control means at said ISDN testing facility for controlling said ISDN testing equipment.

10. The apparatus of claim 9, further comprising a receiving facility remote from said central office, said receiving facility including a receiving means from receiving data supplied to said report communication line and generating a hard copy of said data.

11. The apparatus of claim 9, said ISDN testing equipment including a power supply and means responsive to a remote control signal transmitted from said remote test facility for controlling said power supply means to enable selectively said at least D-channel data obtaining means.

12. A method of remote and unattended testing of an integrated services digital network (ISDN) at a central office, comprising the steps of:
  at said central office,
    (a) selecting a customer ISDN line;
    (b) accessing a U-interface bus of a selected customer ISDN line;
    (c) monitoring at least D-channel data on said selected ISDN line; and
    (d) analyzing the protocol of said at least D-channel data;
    (e) selectively supplying data to a report communication line; and
  at an ISDN test facility remote from said central office,
    (f) generating control signals for controlling steps (b)–(e); and
    (g) transmitting said control signals to said central office.

13. The method of claim 12, further comprising the step of receiving data supplied to said report communication line at a receiving facility remote from said central office.

14. The method of claim 13, further comprising the step of generating a hard copy report from the data received at the receiving facility.

15. A method of testing an integrated services digital network (ISDN) at a central office whereat are located at least one integrated services line unit (ISLU) having a plurality of line cards positionable in line card "slots" in circuit with corresponding U-interfaces each containing ISDN B- and D-channel data and wherein at least one of said line card slots is available as a sparing slot to receive a selected one of said line cards associated with an ISDN line selected to be tested, said sparing card being reroutable to replace said selected line card, said method comprising the steps of:
  at said central office
    (a) selecting an ISDN line to be tested,
    (b) accessing a U-interface bus of a selected ISDN line by routing said selected line card to said sparing slot containing said sparing card,
    (c) monitoring at least D-channel data at the output of said sparing card, and
    (d) analyzing the protocol of at least said D-channel data;
    (e) selectively supplying data to a report communication line; and
  at an ISDN test facility remote from said central office
    (f) transmitting a first control signal to said central office to control step (b), and
    (g) using a computer, transmitting second and third control signals to said central office for controlling steps (d) and (e), respectively.

16. The method of claim 15, further comprising the step of receiving data supplied to said report communication line at a receiving facility remote from said central office.

17. The method of claim 16, further comprising the step of generating a hard copy report from the data received at the receiving facility.

18. A method of testing an integrated services digital network (ISDN) at a central office whereat are located at least one integrated services line unit (ISLU) having a plurality of line cards positionable in line card "slots" in circuit with corresponding U-interfaces each containing ISDN B- and D-channel data and wherein at least one of said line card slots is available as a sparing slot to receive a selected one of said line cards associated with an ISDN line to be tested, said sparing card being reroutable to replace said selected line card, said method comprising the steps of:

at said central office
(a) selecting a customer ISDN line,
(b) accessing a U-interface bus of a selected ISDN line by routing said sparing card to a selected customer ISDN line,
(c) in series with said U-interface, monitoring at least D-channel data from said selected ISDN line, and
(d) analyzing the protocol of said at least D-channel data;
(e) selectively supplying data to a report communication line; and at an ISDN test facility remote from said central office
(f) generating control signals,
(g) transmitting said control signals to said central office, and
(h) applying said control signals at said central office to control steps (b)-(e).

19. The method of claim 18, further comprising the step of receiving data supplied to said report communication line at a receiving facility remote from said central office 20. The method of claim 19, further comprising the step of generating a hard copy report from the data received at the receiving facility.

21. In a central office containing customer ISDN lines and a "U" interface monitoring system (UIMS) that converts selectively each one of a plurality of "U" interfaces to serial output data including B-channel data and D-channel data, and an integrated services line unit (ISLU) for interconnecting a selected one of said customer ISDN lines and said UIMS, said ISLU containing said plurality of "U" interfaces and a corresponding plurality of line cards positionable in line card "slots" in circuit with said U-interfaces and wherein at least one of said line card slots is available as a sparing slot to interface with said UIMS and further wherein at least one of said line cards is configured as a sparing card and is reroutable to said at least one sparing slot to replace a line card associated with a customer ISDN line to be tested, a method for remote and unattended testing and reporting of protocol on said customer ISDN lines, comprising the steps of:

at said central office
(a) applying operating power to said UIMS,
(b) selecting a customer ISDN line,9
(c) accessing a U-interface bus of a selected customer ISDN line by routing said sparing card to the selected line,
(d) connecting said sparing card to said UIMS and monitoring at least D-channel data from said selected line,
(e) analyzing the protocol of said at least D-channel data,
(f) supplying data to a report communication line; and
(g) removing operating power from said UIMS; and at an ISDN test facility remote from said central office
(h) using a computer, generating a first group of control signals for controlling steps (e)-(g) and using an access line, transmitting said control signals to said central office, and
(i) transmitting a control signal via a trunk line work station to said central office to control step (c).

22. The method of claim 21, further comprising the step of receiving data supplied to said report communication line at a receiving facility remote from said central office.

23. The method of claim 22, further comprising the step of generating a hard copy report from the data received at the receiving facility.

24. In a central office containing customer ISDN lines and a "U" interface monitoring system (UIMS) that converts selectively each one of a plurality of "U" interfaces to serial output data including B-channel data and D-channel data, and a plurality of integrated services line units (ISLU's) for interconnecting a selected one of said customer ISDN lines and said UIMS, said ISLU's containing said plurality of "U" interfaces and a corresponding plurality of line cards positionable in line card "slots" in circuit with said U-interfaces and wherein at least one of said line card slots is available as a sparing slot to interface with said UIMS and further wherein at least one of said line cards is configured as a sparing card and is reroutable to said at least one sparing slot to replace a line card associated with a customer ISDN line to be tested, a method for remote and unattended testing of protocol on said customer ISDN lines, comprising the steps of:

at said central office
(a) selecting a particular one of said ISLU's containing a customer ISDN line to be tested;
(b) selecting a customer ISDN line in the ISLU selected in step (a),
(c) accessing a U-interface bus of a selected customer ISDN line by routing said sparing card to the selected line,
(d) connecting said sparing card to said UIMS and monitoring at least D-channel data from said selected line, and
(e) analyzing the protocol of said at least D-channel data;
(f) selectively supplying data to a report communication line; and at an ISDN test facility remote from said central office
(g) using a computer, generating a first control signal for controlling step (a) and using an access line, transmitting said first control signal to said central office,
(h) transmitting a second control signal via a trunk line work station to said central office to control step (c),
(i) using said computer, generating a third control signal to control step (e) and using said access line, transmitting said third control signal to said central office, and
(j) using said computer, generating a fourth control signal to control step (g) and using said access line, transmitting said third control signal to said central office.

25. The method of claim 24, further comprising the step of receiving data supplied to said report communication line at a receiving facility remote from said central office.

26. The method of claim 25, further comprising the step of generating a hard copy report from the data received at the receiving facility.

* * * * *